United States Patent [19]

Ohkuoo et al.

[11] 4,009,570
[45] Mar. 1, 1977

[54] TORQUE CONVERTER

[75] Inventors: Masahiro Ohkuoo, Kadoma; Heiji Fukutake, Osaka, both of Japan

[73] Assignee: Kabushiki Kaisha Daikin Seisakusho, Osaka, Japan

[22] Filed: Nov. 13, 1975

[21] Appl. No.: 631,663

[30] Foreign Application Priority Data

Nov. 28, 1974 Japan .............................. 49-137392

[52] U.S. Cl. .................................. 60/341; 60/362; 60/367; 60/458
[51] Int. Cl.² ........................................ F16D 33/00
[58] Field of Search ............ 60/341, 361, 362, 364, 60/367, 458

[56] References Cited
UNITED STATES PATENTS 3,125,857   3/1964   Schneider ............................ 60/361

*Primary Examiner*—Edgar W. Geoghegan
*Attorney, Agent, or Firm*—Pierce, Scheffler & Parker

[57] ABSTRACT

A torque converter comprises a vaned rotary impeller shell secured to the flywheel of a motor for driving the same, a vaned rotary turbine component secured to a turbine shaft which constitutes the output of the converter as a result of the torque conversion which takes place between the impeller and turbine vanes, and a vaned stator component located between the impeller and turbine vanes and which is coupled to a stator shaft surrounding the turbine shaft by means of a one-way clutch. In order to permit the one-way clutch to be easily removed, the impeller shell includes a removable hub portion secured by means of a ring of bolts to a flange on the impeller shell and this flange is dimensioned in such manner that its internal diameter is greater than the external diameter of the one-way clutch. Thus when the impeller hub is removed, the one-way clutch can be slid axially from its operating position and removed through the opening created by removal of the hub.

1 Claim, 3 Drawing Figures

TORQUE CONVERTER

DETAILED DESCRIPTION OF THE INVENTION

This invention relates to a torque converter used in industrial vehicles such as a fork lift truck etc. and automobiles, and an object of which is to facilitate easy disassembling and inspection of a one-way clutch assembled in between a stator and stator shaft.

Figure 1:
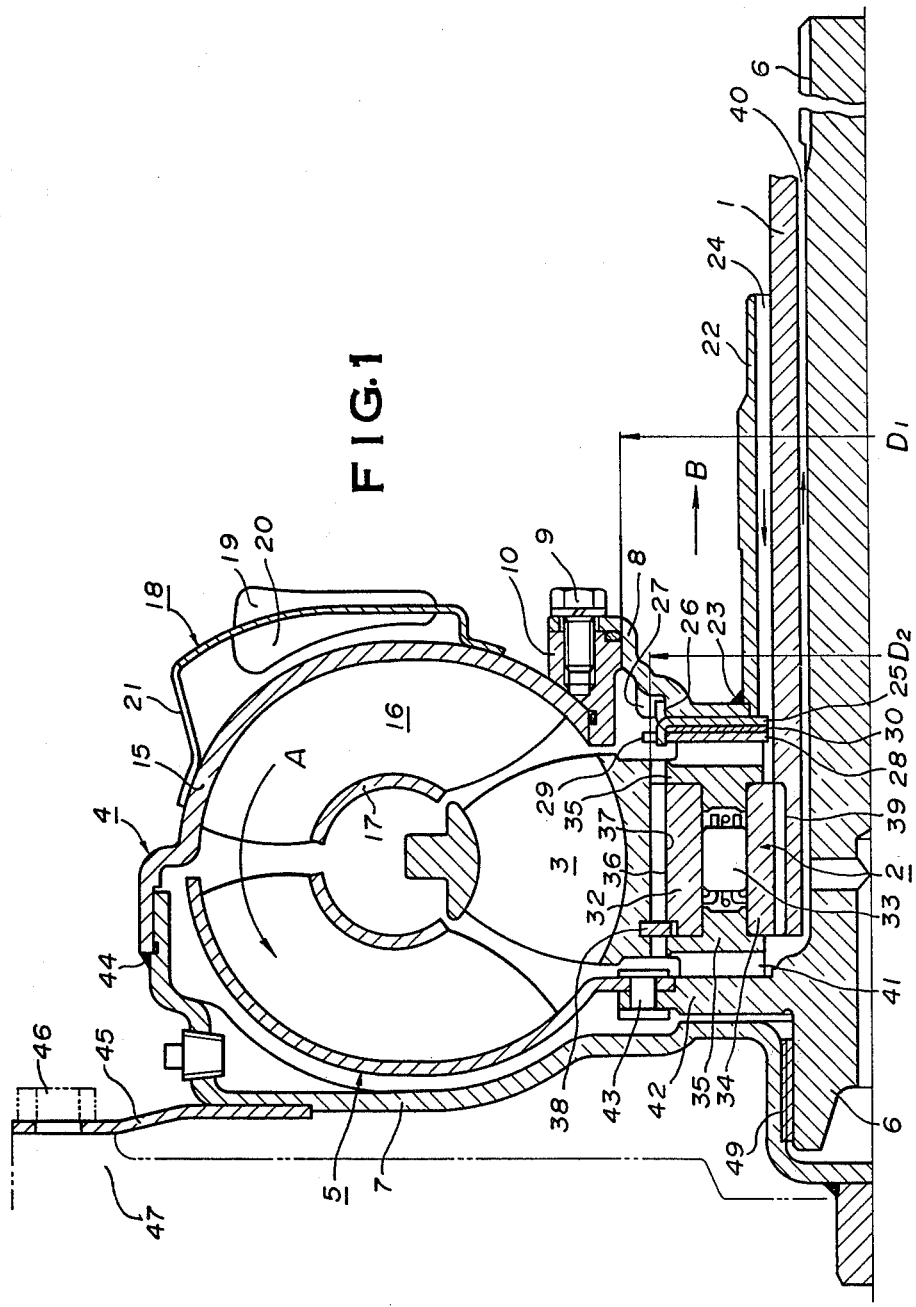
Figure 2:
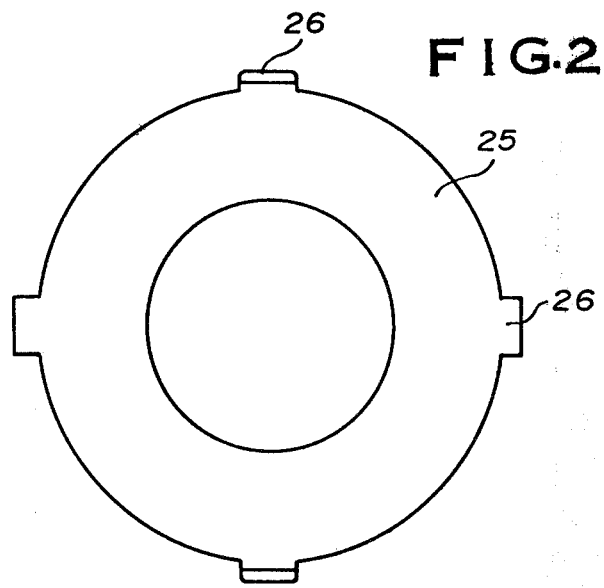
Figure 3:
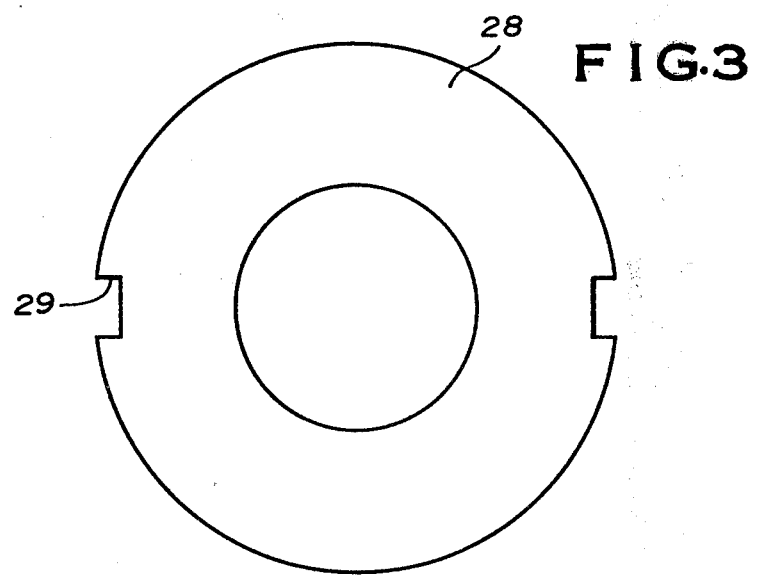

FIG. 1 is a vertical sectional view of a torque converter in accordance with this invention, FIGS. 2 & 3 are plan views of parts in FIG. 1.

Generally, in a torque converter, a vaned stator 3 is fitted to a stator shaft 1 (FIG. 1) through a one-way clutch. Working fluid accelerated by a vaned impeller 4 in the direction of arrow A passes through a vaned turbine 5 to the vaned stator 3. When the speed ratio of a turbine shaft 6 reaches a specified value, the vaned stator 3 stops and changes the direction of flow to increase the torque of the vaned turbine 5. When the speed ratio becomes larger than the specified value, the vaned stator rotates in the same direction as the vaned turbine 5 to convert the torque converter into a shaft coupling. In a stall condition such as occuring immediately before starting, however, a large reaction acts on the vaned stator 3 to easily cause slippage in a one-way clutch 2. This tendency is frequently found in vehicles having a large stall torque such as industrial vehicles. If the slippage takes place in the one-way clutch 2, starting acceleration performance is largely lessened to impair working efficiency.

In a conventional torque converter for use in automobiles, etc., there is one in which the vaned impeller 4, rotary housing 7, and impeller hub 8 are all welded together. In this type of torque converter, however, if any slippage takes place in the one-way clutch 2, it is impossible to exchange the one-way clutch 2 to provide an economical torque converter. Further, a well-known construction also prevails, in which the vaned impeller 4 and rotary housing 7 are tightened by a plurality of bolts arranged circumferentially. In this type of torque converter, however, it is impossible to disassemble and assemble the one-way clutch 2 unless the whole vaned impeller 4 is taken out axially in the right direction. Also, a construction is known, in which the vaned impeller 4 can be attached to and detached from an impeller hub 8 by means of a plurality of bolts 9 circumferentially arranged. In this case, however, it is impossible to solely remove the one-way clutch with the vaned impeller 4 left as it is even if the bolts 9 are loosened to take out the impeller hub 8, because the inside diameter $D_1$ of a flange 10 on the impeller is smaller than the outside diameter $D_2$ of the one-way clutch 2.

An object of this invention is to improve the above mentioned disadvantage by making the inner diameter $D_1$ of the flange 10 on the impeller larger than the outer diameter $D_2$ of the one-way clutch 2. The present invention will be better understood from the following description taken in connection with the accompanying drawings. The vaned impeller 4 includes a plate shell 15, vanes 16, and coring 17 in solid construction. An annular plate fan 18 is welded to the outer surface of the shell 15. Numerals 19 and 20 designate an axial fan and centrifugal fan formed by punching and press work respectively, and 21 is an exhaust port. The impeller flange 10 is brazed to an inner peripheral part of the shell 15 in order to increase its stiffness, and the press formed impeller hub 8 is fastened to the right face of the flange 10 by means of the bolts 9. Numeral 22 designates a guide pipe welded to the hub 8 at its inner peripheral part 23, forming a working fluid supplying passage 24 in combination with the stator shaft 1 therein. An annular holding plate 25 provides four projections 26 (FIG. 2) integrally at its outer periphery, two of them engage with a projection 27 of the impeller hub 8, the remaining two projections engage with a hollow portion 29 at the outer periphery of a side washer 28 (FIG. 3), thus securing an interlocked state between the impeller hub 8 and side washer 28. Element 30 is a spacer.

The one-way clutch 2 consists of an outer race 32, brake piece 33 in the form of a roller, inner race 34, and collar 35 etc. Projections 37 provided at three places on the inner periphery of the cast vaned stator 3 engage with axial grooves 36 provided at three places on the outer periphery of the outer race 32, and a snap ring 38 is fitted to the opposite end to the take-out direction B of the one-way clutch 2. The inner race 34 engages with a spline cut on the stator shaft 1 through a spline 39 fixed thereon. The roller 33 which has a conventional shape of a cocoon for ex., makes contact with the facing surfaces of the outer race 32 and inner race 34 and is held in place by means of a retainer, a plurality of rollers being disposed at the same pitch in the retainer. A return passage 40 provided between the stator shaft 1 (fixed) and turbine shaft 6 is connected to an inside of the torque converter through groove 41 which is provided at the side face of the collar 35 in the radial direction.

The vaned turbine vane 5 is fixed to a turbine hub 42 constructed with the driven turbine shaft 6 at the output side by means of a plurality of circumferentially arranged rivets 43, and the turbine shaft 6 is supported by the rotary housing 7 through a bush 49. The rotary housing 7 and shell 15 are welded together at a part 44, and an input plate 45 welded to the housing 7 is fixed to an engine flywheel 47 by means of bolts 46.

When the engine is under operation, the vaned impeller 4 is also rotated since it is directly coupled to the engine, and thus an engine torque is taken out through working fluid in the torque converter from the vaned turbine 5 and turbine shaft 6. As mentioned above, the stall torque decreases if slippage in the one-way clutch 2 takes place during operation, so that it becomes necessary to inspect and exchange the one-way clutch 2. In this case, after a mission housing (not illustrated) surrounding the torque converter is removed, the bolts 9 are pulled out, the impeller hub 8 is separated from the impeller flange 10, and the impeller hub 8 is taken out in the direction of arrow B. The holding plate 25, spacer 30, and side washer 28 are taken out in the direction of arrow B in turn, thus the whole of the one-way clutch 2 being revealed from an opening portion of the inner diameter $D_1$ of the impeller flange 10. The stator shaft 1 is drawn out in the direction of arrow B whereupon, it becomes possible to take out the one-way clutch 2 comprising the outer race 32, collar 35, rollers 33, and inner race 34 etc. one by one or in a single body in the direction of arrow B. A new one-way clutch of no slippage or adjusted one-way clutch 2 can be assembled into the vaned stator 3 in the reverse order of the above mentioned procedures.

As can be understood from the foregoing description, in the present invention the impeller flange 10 and impeller hub 8 are fastened together by the bolts 9, and at the same time the inner diameter $D_1$ of the impeller flange 10 is made larger than the outer diameter $D_2$ of the one-way clutch 2. Therefore, this invention provides the advantages, that by only removing the impeller hub 8, that 1) the one-way clutch 2 can be checked, disassembled, assembled, and exchanged with the vaned impeller 4 kept at its original state; 2) inspection and maintenance of the torque converter are facilitated; and 3) it becomes possible to maintain high performance of the torque converter for a long period at low cost. Owing to its simple construction, manufacturing thereof also becomes easy. This invention can also be applied to a torque converter in which the vaned impeller 4 and rotary housing 7 are fastened by bolts instead of the welded part 44.

We claim:

1. A torque converter comprising a driving vaned impeller including a shell to which the vanes are secured, a driven vaned turbine fixed to a driven shaft, a vaned stator disposed intermediate said vaned impeller and vaned turbine, said vaned stator being fitted to a fixed stator shaft by means of a one-way clutch, a reinforcing impeller flange fixed to the inner peripheral part of said impeller shell, said impeller flange having an inner diameter larger than the outer diameter of said one-way clutch, and an impeller hub located at the inner side of said impeller flange, said hub including a guide pipe and being removably secured to said impeller flange by a plurality of bolts, and said one-way clutch being easily installable and removable from the converter by axial movement through said impeller flange following removal of only said hub.

* * * * *